United States Patent [19]

Stanzel

[11] 4,003,583
[45] Jan. 18, 1977

[54] TRAILER HAVING A VERTICALLY ADJUSTABLE BED

[76] Inventor: Ned L. Stanzel, R.R. 3, Sac City, Iowa 50582

[22] Filed: Aug. 18, 1975

[21] Appl. No.: 605,340

[52] U.S. Cl. .............................. 280/43.22; 214/512; 280/43.23; 280/43.24; 280/414 R

[51] Int. Cl.² ........................................ B62D 61/12

[58] Field of Search ........ 280/43.22, 43.23, 490 R, 280/43.11, 478 A, 43.24, 414 R, 512; 214/506, 505

[56] References Cited

UNITED STATES PATENTS

| | | | |
|---|---|---|---|
| 2,480,909 | 9/1949 | Davis | 280/43.23 X |
| 2,560,625 | 7/1951 | Boggs, Jr. et al. | 280/43.23 X |
| 2,953,266 | 9/1960 | Anderson | 214/506 |
| 3,057,644 | 10/1962 | Fisher | 280/478 A |
| 3,315,976 | 4/1967 | Thiermann | 280/404 X |
| 3,430,791 | 3/1969 | Moss | 214/505 |
| 3,756,443 | 9/1973 | Verschage et al. | 214/506 |

Primary Examiner—Robert R. Song
Assistant Examiner—Michael J. Forman
Attorney, Agent, or Firm—Zarley, McKee, Thomte & Voorhees

[57] ABSTRACT

A trailer bed includes on opposite sides thereof upstanding hollow posts in which downwardly extending hydraulic cylinders are positioned to engage laterally inwardly extending wheel axles thereby extension of the cylinders raises the bed relative to the ground. The tongue of the trailer includes a pair of vertically spaced parallel members extending forwardly and connected to a hitch plate with a hydraulic cylinder carried on the tongue being connected to the parallel members for raising and lowering the tongue relative to the hitch plate adapted to be connected to the drawbar of a tractor. Spring-loaded actuator pins provided for locking the axels to the posts and locking the parallel members to the tongue for maintaining the trailer bed in a raised position. Actuating means extend from the locked pins to the front of the trailer for operation by the operator of the tractor.

6 Claims, 8 Drawing Figures

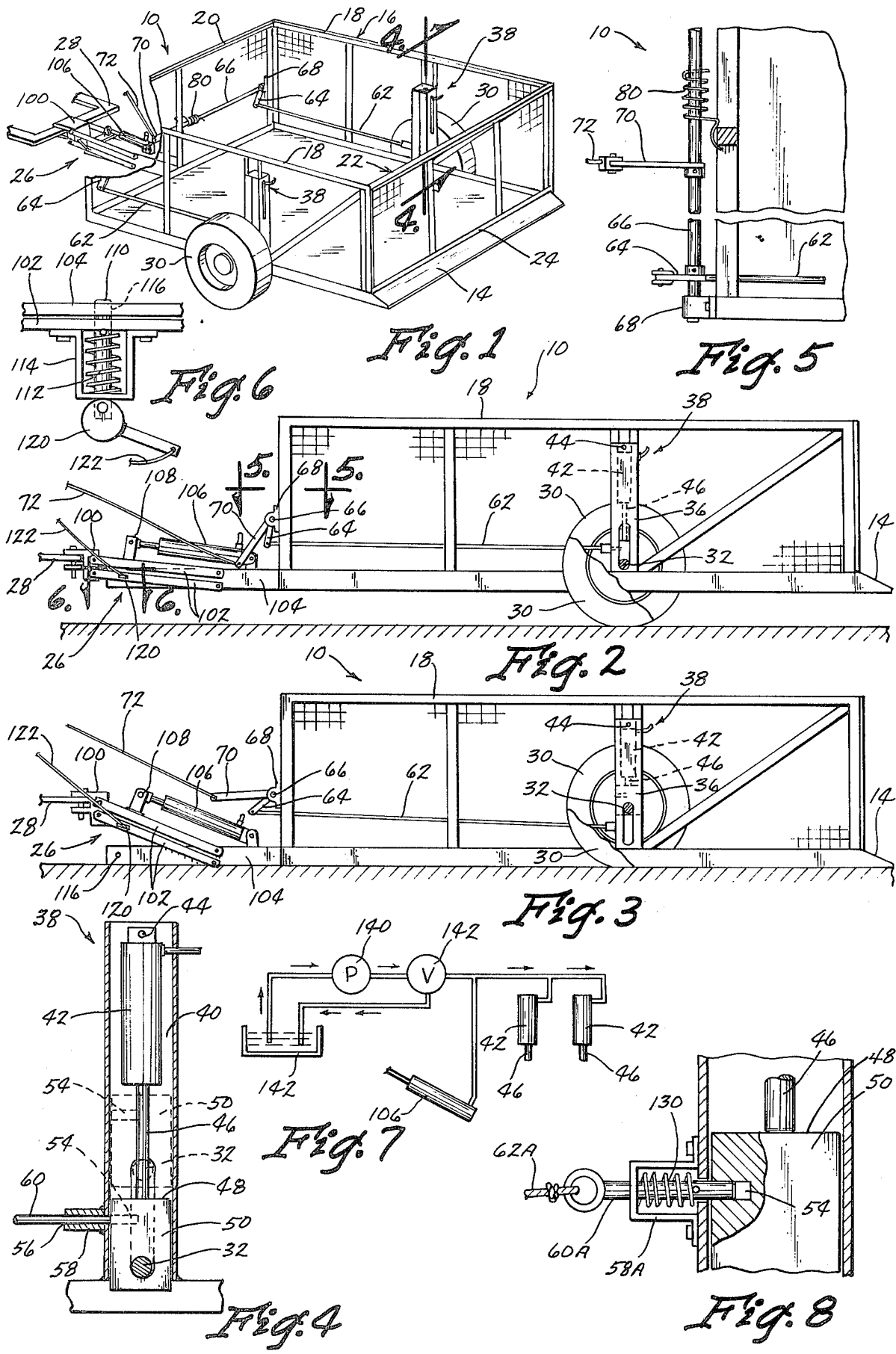

TRAILER HAVING A VERTICALLY ADJUSTABLE BED

BACKGROUND OF THE INVENTION

The moving of animals such as pigs on a farm from one location to another ordinarily involves use of a loading ramp or chute in conjunction with a truck or trailer since the animals cannot step onto the bed of the vehicle without assistance from a ramp provided in a loading chute.

SUMMARY OF THE INVENTION

This invention permits a farm trailer to be lowered to the ground such that the animals may walk directly onto the bed of the trailer without having to step up to get into the trailer. The bed of the traler is enclosed by side walls which include a rearwardly opening gate which provides an entryway and a ramp-like plate extends from the bed rearwardly to provide a gentle incline from the bed to the ground. The bed of the trailer is capable of being totally lowered to the ground by the use of hydraulic cylinders positioned in hollow posts and in turn connected to axles of ground engaging wheels. A tongue includes a hitch plate for connection to a tractor drawbar wherein the tongue is connected to the hitch plate by a pair of vertically spaced parallel members connected to a hydraulic cylinder. The rear axles may be locked to the posts just as the tongue may be locked to the hitch plate to take the load off of the hydraulic cyliinders during the transport of the animals.

DESCRIPTION OF THE DRAWINGS

FIG. 1 is a fragmentary perspective view of the trailer of this invention having a vertically adjustable bed.

FIG. 2 is a side elevation view thereof with the bed in its raised position.

FIG. 3 is a view similar to FIG. 2 but showing the bed in its lowered position engaging the ground.

FIG. 4 is a cross sectional view taken along line 4 — 4 in FIG. 1.

FIG. 5 is a cross sectional view taken along line 5 — 5 in FIG. 2.

FIG. 6 is a cross sectional view taken along line 6 — 6 in FIG. 2.

FIG. 7 is a schematic view of the hydraulic circuitry, and

FIG. 8 is an enlarged cross sectional fragmentary view of a modified locking pin arrangement for locking the rear axle to the post.

DESCRIPTION OF THE INVENTION

The trailer of this invention is referred to generally in FIG. 1 by the reference numeral 10 and includes a bed 12 having a rearwardly extending ramp plate 14. A wall enclosure 16 is provided which includes side walls 18, a front wall 20 and a rear wall 22 having a gate 24. A tongue assembly 26 is provided at the front end of the trailer 10 for connection to a drawbar 28 on a tractor, not shown.

A pair of ground support wheels 30 are provided on opposite sides of the trailer bed and include axles 32 extending laterally inwardly into a vertically oriented slot 34 in the wall 36 of a post 38 having a passageway 40. A downwardly extending hydraulic cylinder 42 is connected by a pin 44 to the post 38 and the downwardly extending piston rod 46 engages the top surface 48 of a block 50 connected to the axle 32. The block 50 has a configuration such that it matingly engages the side walls of the post to limit lateral movement of the block in any direction while permitting vertical movement in response to operation of the hydraulic cylinder 42. A hole 54 is provided in the side of the block 50 for alignment with a passageway 56 in a guide sleeve 58 mounted on the side of the post which receives a locking pin 60 such that the locking pin 60 may be received in the hole 54 and integrally lock the block 50 and the axle 32 to the post 38 thereby taking the load off of the hydraulic cylinder 42 particularly when the trailer is being used for transporting.

The locking pin 60 is further seen in FIG. 3 to be connected to an actuating rod 62 which extends forwardly from each of the posts 38 and the rods 62 are connected at their forward ends to downwardly and forwardly extending lever 64 carried on a shaft 66 mounted by bracket 68 to the front wall 20. A transversely disposed trip lever 70 also extends from the shaft 66 and includes a trip cord 72 for operation by the driver of the prime mover. As seen in FIG. 5 a coil spring 80 is mounted on the shaft 66 to normally rotate it counterclockwise thereby causing the actuating rod 62 to move rearwardly and force the locked pins 60 into engagement with the holes 54 in the blocks 50 and thereby maintain the bed of the trailer in its raised position of FIG. 2. The pressure of the spring 80 may be overcome by pulling on the trip lever 70 by the rope 72 thereby allowing the bed 12 to be lowered to the position of FIG. 3 while the hydraulic cylinders 42 are retracted. The hydraulic cylinders 42 may be single acting due to the fact that the weight of the bed will force the piston rods 46 upwardly when the bed is being lowered.

The tongue assembly 26 is seen to include a hitch plate 100 connected to the drawbar 28 and further includes two horizontally spaced apart pair of parallel numbers 102 vertically spaced apart and extending rearwardly for pivotal connection to a rigid tongue member 104. A power cylinder 106 is connected to the top of the tongue member 104 and extends forwardly for connection to a post 108 on the top parallel members 102 (FIG. 1) whereby extension of the cylinder 106 causes the trailer to be raised as shown in FIG. 2 while contraction of the cylinder 106 causes the trailer to be lowered at the front end. In FIG.6 a lock pin 110 is seen extending through a spring 112 in an enclosure 114 secured to the side of the lower parallel member 102 such that when the trailer is in its raised position of FIG. 2 the pin will be received in aligned opening 116 in the tongue 104 to lock the trailer in its raised position thereby protecting the cylinder 106. An overcenter cam 120 is provided on the outer end of the pin 110 and includes a cord 122 which may be operated by the driver of the tractor.

In FIG. 8 an alternate embodiment of the lock pin for the hydrualic cylinder is shown. A lock pin 60A is connected to a flexible actuating member shown to be a cord 62A and the guide sleeve 58A includes a coil spring 130 which urges the pin 60A into its locked position where it is received in the hole 54 in the block 50. It is the understood that the embodiment of FIGS. 1–7 requires that the actuating rod 62 be capable of being placed in compression while the embodiment of FIG. 8 allows for a cord 62A to be used which is only placed tension during operation.

Thus it is seen that in operation the trailer 10 is pulled to the loading station as seen in FIG. 2 and then the hydraulic cylinders 46 are operated by the pump 140 connected to a hydraulic supply source 142 on the tractor and oil is pumped through the valve 142 which controls the cylinders 46 thereby causing the cylinders to contract and allowing the bed 12 to be lowered to the ground. At the same time or independently, the tongue hydraulic cylinder 106 may be contracted thereby allowing the front end of the trailer 10 to be lowered to the ground. Prior to operation of the cylinders, of course, the block pins 110 and 60 will have been actuated to their retracted position by the operation of the trip cords at the driver's station. The gate 24 may be opened and the animals may be guided into the enclosure provided by the walls on the bed. The ramp 14 makes for a gentle incline from the ground to the bed 12. The gate 24 is then closed and the hydraulic cylinders 46 and the tongue cylinder 106 are operated to extend them thereby forcing the trailer upwardly relative to the ground and the lock pins then move into engagement with the aligned openings and the block 50 and the tongue 104.

I claim:

1. A trailer having a vertically adjustable bed comprising, a bed having forward and rearward ends and having a frame and a forwardly extending tongue connected to said frame, ground-engaging wheels disposed on opposite sides of said bed rearwardly of the forward end thereof, and said wheels each having transversly inwardly extending axles, a pair of upstanding posts, one on each opposite side of said bed connected to said frame, said posts including side walls defining a hollow enclosure and one of said side walls including an elongated slot through which said axles extend, each of said axles including a block integrally secured thereto and positioned in said enclosure and said block having a configuration for matingly engaging the side walls of said enclosure to prevent all lateral movement of said block in said enclosure, a locking pin is horizontally movably carried on each of said posts for selectively engaging said block to lock said axle to said post, an actuating means extending to the front of said bed from said locking pins and said pins being spring loaded to a normal locked position, a vertically positioned hydraulic cylinder positioned in and connected to each post and extending downwardly into engagement with said adjacent blocks, control means for extending and contracting said cylinders for raising and lowering the rear end of said bed relative to the ground, and power means operatively connected to said bed at the forward end thereof for raising and lowering the forward end thereof such that said bed may be raised and lowered to positions parallel to the ground.

2. The structure of claim 1 wherein said actuating means includes elongated elements on opposite sides of said bed connected to levers on a common shaft at the front of said bed, and a trip member is connected to said shaft adapted for operation by the driver of a prime mover connected to said trailer.

3. The structure of claim 2 wherein said elongated elements are flexible and said spring loaded pins are further defined by a spring being connected between said post and said pin to normally maintain said pin in a locked position.

4. The structure of claim 2 wherein said elongated elements are rigid and said spring loaded pins are further defined by a spring being connected to said shaft and normally urging said elongated elements rearwardly placing them in compression and urging said pins into a locked position.

5. The structure of claim 1 wherein said tongue includes a hitch assembly comprising a pair of vertically spaced parallel members pivotally connected to said tongue and extending forwardly and pivotally connected to a hitch plate adapted to be connected to the drawbar of a tractor, and a power means is connected between said tongue and parallel members to raise and lower said tongue relative to the ground.

6. The structure of claim 5 wherein a spring loaded lock pin is provided to normally lock said parallel members to said tongue and an actuating means is connected to said lock pin for selectively operating said lock pin.

* * * * *